Dec. 1, 1959 S. O. JONES 2,915,617
STUD WELDING GUN
Filed Dec. 27, 1957

INVENTOR.
Samuel O. Jones
BY
Shoemaker + Mattare
ATTYS

United States Patent Office 2,915,617
Patented Dec. 1, 1959

2,915,617

STUD WELDING GUN

Samuel O. Jones, Newport News, Va., assignor to Newport News Shipbuilding and Dry Dock Company, Newport News, Va., a corporation of Virginia Application December 27, 1957, Serial No. 705,637

7 Claims. (Cl. 219—98)

This invention relates to welding devices and pertains more particularly to improvements in pin welding guns.

In the welding field, particularly welding aboard ships for the shipbuilding industry, considerable use is made of stud welding equipment. At the present time, such equipment includes a more or less stationary power supply and a gun electrically connected to the supply and easily portable from place to place to perform the desired welding operations. Conventional guns presently available are so constructed as to accommodate a great variety of stud sizes up to and including relatively large studs and these guns are characterized by their substantial amount of weight and, although they perform the desired function acceptably, in circumstances where a great number of studs are to be welded, the worker quickly becomes fatigued due to the extremely heavy weight of these guns. Since stud welding aboard ships is of such importance, it is highly desirable to have available a light-weight gun and yet one which is fully effective for the purposes intended. It is, therefore, a primary object of this invention to provide improvements and refinements in the manufacture of stud welding guns of the condenser discharge type such that the gun is of sufficiently light weight as to enable an operator to perform welding operations for a normal time period without undue fatigue.

Another object of this invention is to provide a light-weight welding gun of the character described constructed of several easily manufactured and light weight component parts, the various parts being characterized by their ability to be easily assembled and disassembled so that worn or damaged portions thereof may be readily and easily changed in the field with minimum loss of shut down time.

Still another object of this invention is to provide a welding gun assemblage of the character described wherein the relationship of the various component parts thereof is such that a minimum number of parts is utilized without sacrificing any efficiency in the operation thereof, while at the same time achieving a sufficiently light-weight assembly as to be practical for operation over a long period of time by the same operator without undue fatigue.

A further object of this invention is to provide a welding gun of the character described including a hand grip assembly and a removable frame readily securable thereto, the frame being of hollow construction and housing a cup element within which is slidable a second cup element carrying a chuck for studs and with the latter cup being normally resiliently urged to an extended position for engaging a stud held by the chuck against a work piece and with the chuck being electrically connected to a source of welding current by means of a plunger element serving this purpose and also the purpose of securing the chuck to the second cup and further being provided with means to limit the extended position of the plunger and chuck, thus reducing the number of essential parts and enable the assembly to be made as light weight as possible.

With the above and other objects in view, the invention consists in the construction and novel combination and arrangement of parts hereinafter fully described, illustrated in the accompanying drawing and pointed out in the claims hereto appended, it being understood that various changes in the form, proportions, and minor details of construction, within the scope of the claims, may be resorted to without departing from the spirit or sacrificing any of the advantages of the invention.

Figure 1:
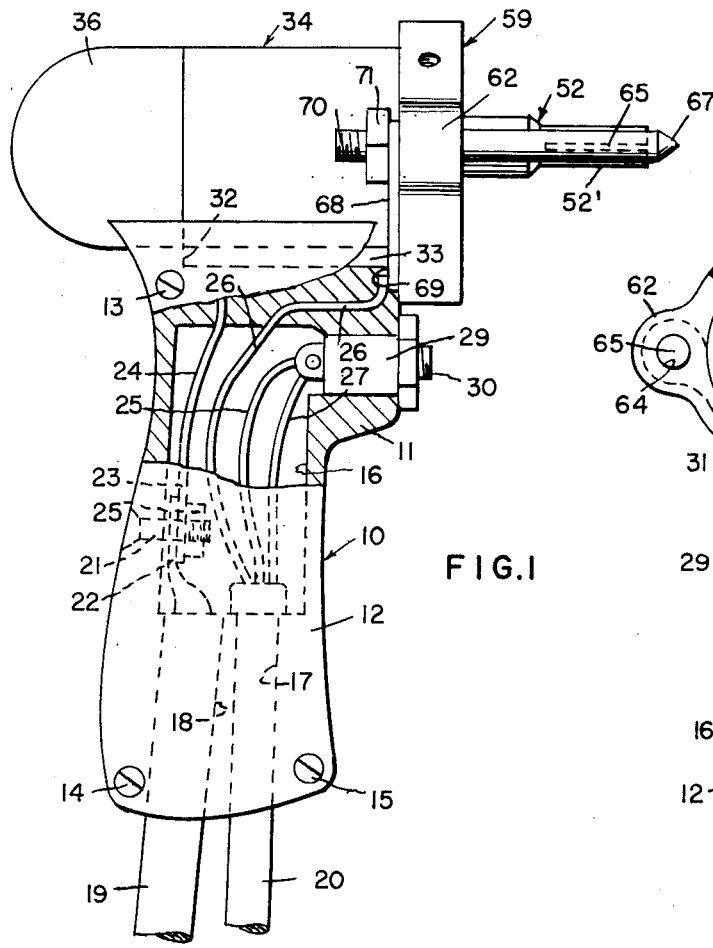
Fig. 1 is a side elevational view of the improved stud welding gun with portions thereof broken away to show details of the construction of the handle assembly.
Figure 2:
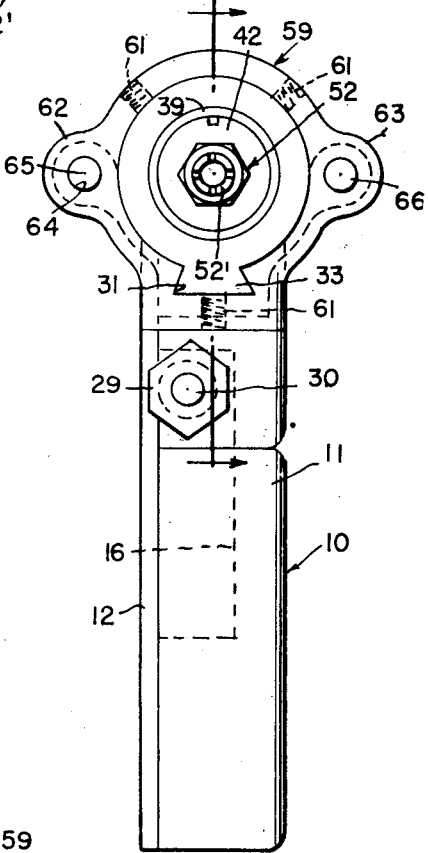
Fig. 2 is a front elevation of the improved gun.

Referring at this time more particularly to the drawing, reference numeral 10 indicates the handle assembly in general and will be seen to include a main body portion 11 and a side cover plate 12, the latter of which is affixed to one side of the main body portion 11 by means of a plurality of screw fastening devices 13, 14, 15, etc. The handle 10 has its main body portion 11 hollowed out to provide a recess or chamber 16 and extending from the butt or lower end of the handle of a pair of passages 17 and 18 which extend into the chamber 16 to permit the lead-in wires 19 and 20 to extend thereinto.

The conductor or wire 19 is connected to a suitable source of welding current and preferably to a condenser discharge type of current source and for ease of assembly, a mounting stud member 21 extends through the rear portion of the handle into the chamber 16 with one terminal end 22 of the main current supply and a terminal end 23 of the main conductor 24 being coupled together at this point such as by the nut 25, as shown.

The other lead-in conductor 20 carries three smaller conductors or wires 26, 27 and 28. The conductor 26, as will be seen most clearly hereinafter, constitutes a safety lead and prepares the gun for welding operations only at such time as the probes of the gun are grounded against a work piece. The other two conductors 27 and 28 extend to a trigger switch assembly 29 which has a trigger button 30 which, when depressed, completes a circuit through these conductors 27 and 28 to energize the main current supply and permit the welding current to flow through the conductor 19 to the work.

The upper end of the main body portion 11 is provided with a dove tail slot 31 which extends inwardly from the forward side thereof and terminates short of the rear side thereof as at 32. A dove tail key portion 33 is provided on the frame element 34 and is interfitted within the dove tail slot 31 so as to lockingly engage these two parts together. The frame 34 is of generally cylindrical configuration and presents a longitudinally extending bore 35 opening upon the front and rear sides of this element. At the rear side of the frame 34 is provided a cap 36 having an externally threaded collar 37 engaged within an internally threaded portion 38 of the frame as shown most clearly in Fig. 3 and to close the interior of the frame at the rear side thereof.

Figure 3:
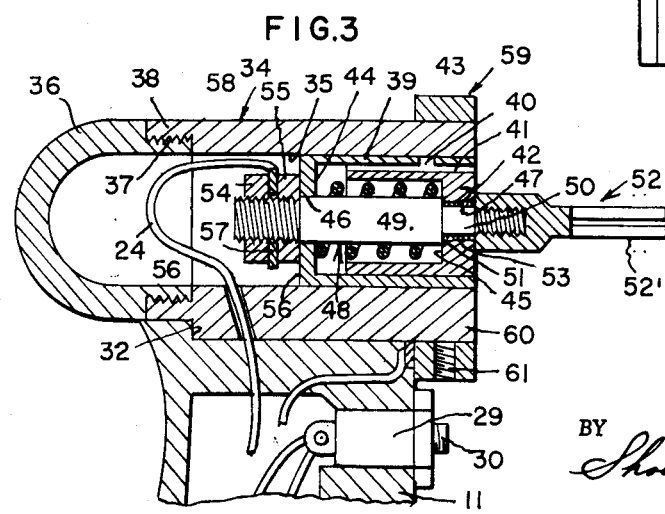
Fig. 3 is a vertical section taken substantially along the plane of section line 3—3 in Fig. 2 and showing details of construction of the main frame and component parts.

At the forward side of the frame is disposed a cup element 39 which snugly fits within the bore in the frame and which carries a radially inwardly directed pin 40 engaged within a keyway 41 in a secondary cup member 42. The second cup 42 is slidably engaged within the first cup 39 and is normally urged to a projected position as shown in Fig. 3 by coil spring 43 which bears at its opposite ends respectively against the inner face 44 of the head of the first cup and the inner face 45 of the head of the second cup.

The head portions of the first and second cups are provided with aligned openings 46 and 47. A plunger element 48 is provided with an enlarged main body portion 49 which snugly but slidably fits within the opening 46 and with a reduced shank portion 50 which is projected through the opening 47, the reduced shank presenting a shoulder 51 which bears against the aforementioned inner face 45 of the secondary cup 42. The secondary cup 42 is secured to the reduced shank portion 50 of the plunger element by suitable means such as silver solder or the like which is preferably disposed between the outer surface of shank portion 50 and the inner surface of the opening 47 through the secondary cup. The free end of the shank 50 is threaded and receives thereon a chuck assembly 52 which engages the outer face 53. The outwardly extending reduced portion 52' of the chuck is provided with four equally spaced longitudinally extending slots which permit a stud to be inserted within the end of the chuck and provide a means for resiliently holding the stud in place within the chuck.

The opposite end 54 of the plunger, that is the free end of the main body portion thereof, is externally threaded and receives thereon a stop nut 55 which, when engaged against the outer face 56 of the head portion of the first cup 39 establishes the fully projected position of the secondary cup 42 and the chuck 52. The stop nut 55 also acts as an abutment element against which the terminal end portion 57 of the main conductor 24 is engaged and with a further nut 58 serving to sandwich the conductor end between the same and the stop nut 55 and to electrically connect the plunger 48 to the main conductor 24.

The chuck 52 is of conventional design and is adapted to receive therein a stud or pin which is to be welded to a bulkhead or the like. In connection with such welding operations, it is to be noted that conventionally, such pins or studs are provided with specially formed end portions for the purpose of permitting a high voltage condenser discharge current to fuse the same for welding the pin or stud to the associated bulkhead or the like. The operation is such that when the stud or pin is engaged against the bulkhead or the like, the spring 43 is somewhat compressed such that when the specially formed end portion of the stud or pin which is engaged against the bulkhead becomes molten, the spring 43 will push the stud or pin against the bulkhead and cause the same to fuse therewith.

For the purpose of positioning the stud or pin with relation to the bulkhead, the collar assembly 59 is mounted on the forward end of the frame 34. For this purpose, it will be apparent that the forward end portion 60 of the frame projects beyond the main body portion 11 of the handle and that the collar 59 engages about this portion 60 of the frame, as can be seen most clearly in Figs. 1 and 3. The collar is held on the frame by a series of set screws 61 so as to enable the collar to be easily removed and replaced. Diametrically disposed on opposite sides of the collar 59 are ear portions 62 and 63, each provided with an aperture 64 through which the probe elements 65 and 66 are projected. Preferably, each probe terminates in a pointed end portion 67 for engagement against the bulkhead or the like and each probe is rigidly affixed to the collar 59 so as to be rigid with respect to the handle 10 and frame 34 and with the chuck 52 being disposed between such probes and normally positioned, in its fully projected position, somewhat behind the terminal end portions 67 of the probes, as is seen most clearly in Fig. 1. When a stud or pin is inserted within the chuck 52, the same will project somewhat beyond the ends 67 of the probes so that when the gun is placed against a bulkhead, the pin, chuck and its associated assemblage will be withdrawn so that the end of the stud or pin and the ends 67 of the probes all engage against the bulkhead.

For safety purposes, it is preferred that the probes also act as conductors for preparing the associated welding circuitry for operation and for this purpose, a connector element 68 is engaged against the rear face of the collar 59 and extends within a recess 69 in the handle whereat it is connected to the conductor 26 previously mentioned. This conductor 26 is part of the preparing circuit and the connector 68 is provided at its opposite end with apertures receiving threaded end portion 70 of the probes 65 and 66 and with a nut 71 being engaged upon each such threaded end portion and electrically connecting the associated probe to the connector 68 so that each probe is electrically connected to the conductor 26. The associated welding circuitry is such that the same will not operate to discharge the condensers until one or both of the probes 65 and 66 is engaged against the work.

It will be readily apparent from the above, that although a highly efficient welding gun has been provided, which is constructed of a minimum of component parts, the same may be made of such light weight as to be extremely practical in shipbuilding operations wherein the gun must be highly portable and in continuous operation for long periods of time. The welding gun according to the invention weighs approximately 2½ pounds in contrast to known welding guns which weigh approximately 8 pounds and, accordingly, it is evident that the present structure provides a great saving in weight thereby affording a substantial reduction in effort required by an operator during welding procedures.

I claim:

1. A welding gun comprising a handle member having a main frame element mounted at the upper end thereof, said frame element having a bore therein opening upon the forward side of the handle, a first cup element snugly fitted within said bore and having the open end thereof disposed substantially flush with the open end of the bore, a second cup member slidably received within the open end of the first cup member and reversed in disposition with respect thereto, a spring member disposed between said cups and normally urging the same apart, a plunger slidably received through the end wall of the first cup member and having its opposite end anchored to the second cup member and carrying a stud chuck outwardly of the second cup, a current carrying means fastened to the other end of said plunger exteriorly of the first cup and being constrained thereby to determine the outermost position of the second cup with respect to the first cup, and a trigger assembly carried by said handle for selectively energizing said current conductor.

2. A stud welding gun comprising a hollow handle member, a main frame element fixed to the upper end of said handle and extending transversely thereof, said main frame member being of cylindrical configuration and open at both ends thereof, a first cup fitted frictionally within said frame member at the forward open end thereof with the open end of such cup disposed substantially flush with the open end of the frame member, a second cup slidably received in the first cup and having the open end thereof facing the inwardly disposed end wall of the first cup, a plunger projecting through said end wall of the first cup and through the end wall of the second cup and being rigidly affixed to the second cup and carrying a stud chuck at the outer free end thereof, the opposite end of said plunger being threaded and receiving a stop nut thereon engageable with the end wall of said first cup and limiting the projected position of the second cup with respect to the first cup, a compression spring housed within said cups and bearing against the same to normally urge said cups apart, a current carrying conductor disposed about said threaded end portion of the plunger and against said stop nut and having a clamp nut sandwiching the same between the clamp nut and the stop nut whereby the plunger and chuck are electrically connected thereto, and trigger means on said handle for selectively connecting said conductor to a source of welding current.

3. A condenser discharge type welding gun comprising a handle member and a main frame element mounted at the upper end of the handle member, both said handle member and said main frame member being of hollow construction so as to be as light weight as possible, said main frame member having a support element slidably mounted therein, a stud chuck fixed to said support member and projecting beyond said handle member, said support element including a threaded inner portion, a stop nut threadedly mounted on said threaded portion for adjustable movement longitudinally of the support element, and means carried by said frame adapted to engage said stop nut for determining the fully projected position of the stud chuck, and at least one probe element carried by said gun in spaced parallelism with said chuck, there being electrical connections within said handle and main frame members for selectively connecting said chuck member to a source of welding current, and means comprising the sole actuating means for said gun continuously urging said support member and chuck only to a projected position.

4. A condenser discharge type welding gun comprising a handle member having a main frame element mounted at the upper end thereof, said frame element having a passageway therethrough and opening upon the opposite ends thereof, a support element slidably received within said passageway at the forward end of said main frame element and carrying a stud chuck member positioned beyond such forward end of the main frame element, a spring comprising the sole actuating means for said gun and normally urging said support member chuck only to a projected position in which the stud chuck is disposed substantially wholly outside the main frame element, said support element including a threaded inner portion, a stop nut threadedly mounted on said threaded portion for adjustable movement longitudinally of the support element, and means carried by said frame adapted to engage said stop nut for determining the fully projected position of the stud chuck, a cap closing the opposite end of said main frame element and providing access to the interior of said frame element to enable ready adjustment of said stop nut to alter the projected position of the chuck member, and electrical connections within said handle and main frame element for selectively connecting said chuck to a source of welding current.

5. A welding gun comprising a hollow handle member, a main frame member removably mounted at the upper end of said handle member and extending fore and aft with respect thereto, said frame member having a longitudinal bore extending therethrough, a first cup element snugly fitted within said bore and having the open end thereof disposed substantially flush with the open end of the bore, a second cup member slidably received within the open end of the first cup member and reversed in disposition with respect thereto, a spring member housed within said cups and bearing against the same to normally urge them apart, a plunger slidably received through the end wall of the first cup member and having its opposite end projecting through the end wall of the second cup member, said plunger being secured to said second cup member, a stud chuck fixed to said opposite end of the plunger, a current carrying conductor fastened to the opposite end of said plunger exteriorly of the first cup, and a trigger assembly carried by said handle for selectively connecting said current conductor to a source of welding current.

6. A welding gun comprising a handle member, a main frame element mounted at the upper end of said handle member and extending in a fore and aft direction with respect thereto, said frame element having a bore therethrough opening upon the opposite ends thereof, a first cup element snugly fitted within said bore and having an open end thereof disposed substantially flush with the open end of the bore, a second cup member slidably nested within the first cup member but disposed in opposed relationship thereto, a spring member housed within said cups and bearing upon the opposed faces of the end walls thereof to normally urge the same apart, a plunger slidably received through the end wall of the first cup member and having its opposite end projecting through the end wall of the second cup member, said plunger being secured to said second cup member, a stud chuck fixed to said opposite end of the plunger, a stop nut engaged on the other end of said plunger exteriorly of said first cup and presenting a shoulder to limit the amount by which said cups are urged apart, a current carrying conductor received on said other end of the plunger and engaged against said stop nut, a lock nut maintaining said current carrying conductor against said stop nut, and trigger means carried by said handle for selectively connecting said conductor to a source of welding current.

7. A stud welding gun comprising a hollow handle member, a frame element fixed to the upper end of said handle and extending transversely thereof, the main frame member being of cylindrical configuration and open at both ends thereof, a first cup fitted frictionally within said frame member at the forward open end thereof and with the open end of such cup disposed substantially flush with the open end of the frame member, a second cup slidably received in the first cup and having the open end thereof facing the inwardly disposed end wall of the first cup, a plunger projecting through said end wall of the first cup and through the end wall of the second cup, said plunger being secured to said second cup member, a stud chuck threadedly engaged on the outer free end of said plunger, the other end of said plunger being threaded and receiving a stop nut thereon and engageable with the end wall of the first cup to limit the projected position of the second cup with respect to the first cup, a compression spring housed within said cups and bearing against the opposed faces of the end walls of the same to normally urge said cups apart with said stop engaged against the outer face of the end wall of the first cup, a current carrying conductor disposed about said threaded end portion of the plunger and against said stop nut and having a clamp nut sandwiching the same between the clamp and the stop nut whereby the plunger and chuck are electrically connected thereto, trigger means on said handle for selectively connecting said conductor to a source of welding current, a support ring rigidly affixed to the forward end of said main frame member and having a pair of diametrically opposed apertured ears thereon, a probe element received within the aperture of each of said ears and being rigid with respect thereto, a conductor plate extending between said probes and having a portion sandwiched between said support ring and the upper end of said handle member, an electrical conductor extending through said handle and connected to said conductor plate and forming, with said probes, a safety circuit completed by the engagement of said probes against a work piece.

References Cited in the file of this patent

UNITED STATES PATENTS

| Re. 22,310 | Nelson | May 11, 1943 |
| 1,109,592 | Morgan | Sept. 1, 1914 |
| 2,191,494 | Nelson | Feb. 27, 1940 |
| 2,413,189 | Nelson | Dec. 24, 1946 |